(12) United States Patent
Huang et al.

(10) Patent No.: US 9,415,464 B2
(45) Date of Patent: Aug. 16, 2016

(54) LASER MACHINING SYSTEM UTILIZING THERMAL RADIATION IMAGE AND METHOD THEREOF

(71) Applicant: Industrial Technology Research Institute, Hsinchu (TW)

(72) Inventors: Kuang-Yao Huang, Kaohsiung (TW); Yung-Hsing Wang, Taichung (TW); Ying-Hui Yang, Kaohsiung (TW); Pin-Hao Hu, Kaohsiung (TW); Sung-Ho Liu, Kaohsiung (TW)

(73) Assignee: INDUSTRIAL TECHNOLOGY RESEARCH INSTITUTE, Hsinchu (TW)

( * ) Notice: Subject to any disclaimer, the term of this patent is extended or adjusted under 35 U.S.C. 154(b) by 364 days.

(21) Appl. No.: 14/143,829

(22) Filed: Dec. 30, 2013

(65) Prior Publication Data

US 2015/0144604 A1    May 28, 2015

(30) Foreign Application Priority Data

Nov. 27, 2013   (TW) .............................. 102143261 A (51) Int. Cl.
| | |
|---|---|
| B23K 26/04 | (2014.01) |
| B23K 26/03 | (2006.01) |
| B23K 26/08 | (2014.01) |

(52) U.S. Cl.
CPC ............... *B23K 26/034* (2013.01); *B23K 26/04* (2013.01); *B23K 26/08* (2013.01)

(58) Field of Classification Search
CPC .. B23K 26/00–26/0066; B23K 26/02–26/034; B23K 26/04–26/043; B23K 26/08–26/0869
USPC .......................................... 219/121.6–121.83
See application file for complete search history.

(56) References Cited

U.S. PATENT DOCUMENTS

| | | | |
|---|---|---|---|
| 4,417,127 A | 11/1983 | Nachev et al. | |
| 4,618,262 A | 10/1986 | Maydan et al. | |

(Continued)

FOREIGN PATENT DOCUMENTS

| | | |
|---|---|---|
| CN | 1723097 A | 1/2006 |
| CN | 101730607 A | 6/2010 |

(Continued)

OTHER PUBLICATIONS

Doong, Ji-Liang et al., Infrared Temperature Sensing of Laser Welding, Int. J. Mach, Tools Manufact., 1991, pp. 607-616, vol. 31, No. 4.

(Continued)

*Primary Examiner* — Sang Y Paik
(74) *Attorney, Agent, or Firm* — Muncy, Geissler, Olds & Lowe, P.C.

(57) ABSTRACT

A laser machining system and a method thereof are disclosed. The disclosed laser machining system comprises a laser generator, an array photo detector, a processer, and a position controller. The laser generator is configured to emit laser via a first light path onto a work piece. The array photo detector is configured to receive the thermal radiation from the work piece via a second light path, different from the first light path, to generate a thermal radiation image. The processor, electrically coupled to the laser generator and the array photo detector, is configured to calculate a temperature centroid of the thermal radiation image and generate a distance control signal according to the temperature centroid. The position controller, electrically coupled to the processor, is controlled by the distance control signal to make a present distance between the laser machining system equal to a working distance.

34 Claims, 9 Drawing Sheets

(56) References Cited

U.S. PATENT DOCUMENTS

| | | | |
|---|---|---|---|
| 5,155,329 A | | 10/1992 | Terada et al. |
| 6,329,935 B1* | | 12/2001 | Stephen ................ H03M 13/27 |
| | | | 341/81 |
| 6,555,780 B1 | | 4/2003 | Kim et al. |
| 6,670,574 B1 | | 12/2003 | Bates et al. |
| 6,757,055 B1 | | 6/2004 | Kluft |
| 6,858,104 B2 | | 2/2005 | Flanagan |
| 7,380,697 B2* | | 6/2008 | Seki ...................... B23K 9/0953 |
| | | | 228/102 |
| 7,820,936 B2 | | 10/2010 | Weber et al. |
| 7,863,544 B2 | | 1/2011 | Serruys et al. |
| 2004/0048362 A1 | | 3/2004 | Trulson et al. |
| 2010/0140236 A1* | | 6/2010 | Cai ........................ B23K 26/34 |
| | | | 219/121.72 |
| 2011/0002514 A1* | | 1/2011 | Youssefi ................ B23K 26/70 |
| | | | 382/128 |
| 2013/0043225 A1 | | 2/2013 | Schurmann |

FOREIGN PATENT DOCUMENTS

| | | |
|---|---|---|
| CN | 101804511 A | 8/2010 |
| TW | 219956 B | 2/1994 |
| TW | 200818323 A | 4/2008 |
| TW | I414385 B | 11/2013 |

OTHER PUBLICATIONS

Chen, H.B. et al., Multi-frequency fibre optic sensors for in-proces laser welding quality monitoring, NDT$E International, 1993, pp. 67-73, vol. 26, No. 2.

Dorsch, Friedhelm et al., Online characterization of laser beam welds by NIR-camera observation, Proc. of SPIE, 2013, pp. 86030R-1-86030R-12, vol. 8603.

Stehr, T. et al., Closed loop control for laser micro spot welding using fast pyrometer systems, Physics Procedia, 2010, pp. 465-471.

Chivel, Y. Optical in-process temperature monitoring of selective laser melting, Physics Procedia: Lasers in Manufacturing Conference 2013, 2013, pp. 897-903.

Jurca, Marius et al., Temperature field measurement as quality assurance measure in case of laser material processing, Physics Procedia, 2010, pp. 473-481.

"Autofocus; A new dimenston. Three dimensional processing of geometries with automatic re-focussing," O.R. Lasertechnologie GmbH, Dieburg, Germany, http://www.or-laser.com/uploads/tx_ipdatasheet/Autofocus_ENG.pdf, file created Oct. 8, 2013, pp. 1-8.

"Constant focal-diameter and -position over the entore working area; For laser applications with continuously changing beam path lengths," LT Ultra-Precision Technology GmbH, Herdwangen-Schonach, Germany, http://www.It-ultra.com/images/stories/It-ultra/product_information/en/adoptic-afc-brc.pdf, 2010, pp. 1-7.

* cited by examiner

LASER MACHINING SYSTEM UTILIZING THERMAL RADIATION IMAGE AND METHOD THEREOF

CROSS REFERENCE

The present application is based on, and claims priority from, Taiwan Application Serial Number 102,143,261, filed on Nov. 27, 2013, the disclosure of which is hereby incorporated by reference herein in its entirety.

BACKGROUND

1. Field

The present disclosure generally relates to a laser machining system and a method thereof, and particularly to a laser machining system and a method thereof.

2. Related Art

Nowadays, the laser machining system is utilized in a variety of manufacturing method originally performed with the conventional mechanism, such as welding, surface quenching, annealing, and other heat treating technologies, as the developing of the laser technology. For example, the glass packaging technology of the organic light-emitting diode, surface hardening of metal, metal welding, semiconductor impurity diffusion annealing, and semiconductor crystallizing are applications with high potential.

However, there are some considerations of the aforementioned laser machining technology about the temperature of a material illuminated/heated by a laser beam such as temperature value, temperature gradient, temperature distribution, heating time interval, and etc. As such, it is important for the laser machining technology to accurately control temperature-related parameters.

SUMMARY

In one or more exemplary embodiments of this disclosure, a laser machining system may comprise a laser generating device, an array photo detecting device, a processing device, and a positioning device. The laser generating device is configured to project a laser beam onto a work piece via a first light path. The array photo detecting device is configured to detect thermal radiation from the work piece illuminated by the laser beam via a second light path to capture a thermal radiation image, wherein the second light path is different from the first light path. The processing device is electrically coupled to the laser generating device and the array photo detecting device and is configured to calculate a temperature centroid of the thermal radiation image and generate a distance control signal according to the temperature centroid. The positioning device is electrically coupled to the processing device and is configured to be controlled by the distance control signal to make a present distance, between the laser machining system and the work piece, equal to a working distance.

In one or more exemplary embodiments of this disclosure, a laser machining method may comprise: projecting a laser beam onto a work piece via a first light path, detecting thermal radiation from the work piece illuminated by the laser beam via a second light path to capture a thermal radiation image, wherein the second light path is different from the first light path, calculating a temperature centroid of the thermal radiation image, and controlling the laser machining system according to the temperature centroid so that a present distance between the laser machining system and the work piece is equal to a working distance.

In order to make the aforementioned and other features of the present disclosure more comprehensible, several embodiments accompanied with figures are described in detail below.

BRIEF DESCRIPTION OF THE DRAWINGS

The present disclosure will become more fully understood from the detailed description given herein below for illustration only, and thus are not limitative of the present disclosure, and wherein.

DETAILED DESCRIPTION

In the following detailed description, for purposes of explanation, numerous specific details are set forth in order to provide a thorough understanding of the disclosed embodiments. It will be apparent, however, that one or more embodiments may be practiced without these specific details. In other instances, well-known structures and devices are schematically shown in order to simplify the drawing.

Figure 1:
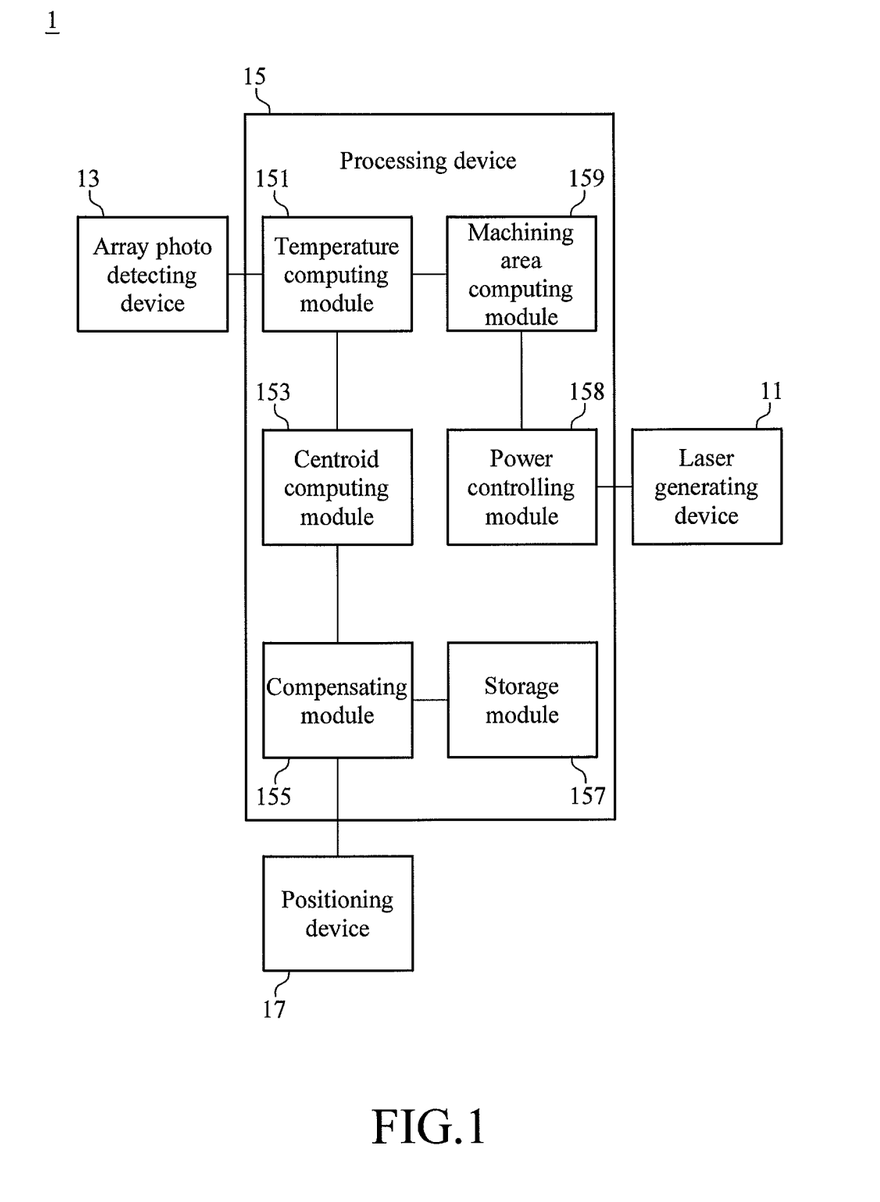
FIG. 1 is the functional block diagram of a laser machining system according to one embodiment of this disclosure.
Figure 2A:
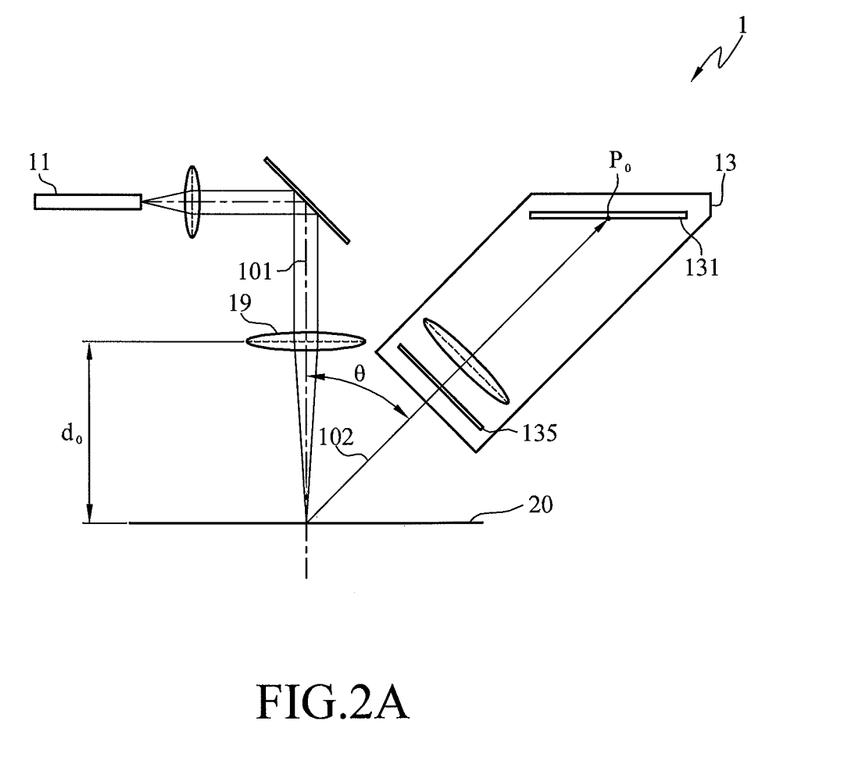
FIG. 2A is a normal operation schematic of a laser machining system according to one embodiment of this disclosure.

Referring to a laser machining system in one embodiment of this disclosure, please refer to FIG. 1 and FIG. 2A, wherein FIG. 1 is the functional block diagram of a laser machining system according to one embodiment of this disclosure while FIG. 2A is a normal operation schematic of a laser machining system according to one embodiment of this disclosure. As shown in FIG. 1A, a laser machining system 1 according to one embodiment of this disclosure may comprises a laser generating device 11, an array photo detecting device 13, a processing device 15, and a positioning device 17. The processing device 15 is electrically coupled to the laser generating device 11, the array photo detecting device 13, and the positioning device 17. The functionality of each of the aforementioned devices is then explained below.

The laser generating device 11 is configured to be controlled by the processing device 15 to project a laser beam onto a work piece 20 via a first light path 101 so that at least a portion of the work piece 20 is heated by the laser beam and emits thermal radiation, and such phenomenon is described in the Wien's distribution law and the Plank's law. For example, the work piece 20 is two metal plates put together to be welded. When the laser generating device 11 projects a high energy laser beam onto the work piece 20, a portion of each metal plate may be heated and melted so that these two metal plates are able to be welded together. In general, the laser generating device 11 is configured to generate laser beam(s) to perform heat treating process such as welding, surface quenching, and/or annealing on the work piece 20. According to one or more exemplary embodiments, the laser generating device 11 may be, for example but not limited to, a gas laser generator, a chemical laser generator, an excimer laser generator, a solid-state laser generator (for example, Nd-YAG laser generator), a fiber laser generator (for example, Yb-fiber laser generator), a photonic crystal laser generator, a semiconductor laser generator, and any other laser generator capable of generating a high power laser beam.

The array photo detecting device 13 is configured to detect thermal radiation from the work piece 20 illuminated by the laser beam via a second light path 102 to obtain a thermal radiation image so as to measure a present distance between a focusing lens 19 and the work piece 20. As shown in FIG. 2A, the second light path 102 is different from the first light path 101, so a first point on the axial line of the first light path 101 is corresponding to a first projected dot on a detecting surface of the array photo detecting device 13 while a second point, different from the first point, on the axial line of the first light path 101 is corresponding to a second projected dot on the detecting surface different from the first projected dot. As a consequence, the present distance, between the focusing lens 19 and the work piece 20, may be measured since a relationship between the points on the axial line of the first light path 101 and the projected dots on the detecting surface can be described as a bijection function.

In an exemplary embodiment, a path angle θ between the first light path 101 and the second light path 102, or equivalently defined by the first light path 101 and the second light path 102, is larger than zero degree. In a further embodiment, the path angle θ is less than sixty degree. According to one or more exemplary embodiments of this disclosure, the array photo detecting device 13 may be, for example but not limited to, a one-dimension charge-coupled device image sensor, a two-dimension charge-coupled device image sensor, an one-dimension metal-oxide semiconductor field effect transistor image sensor, a two-dimension metal-oxide semiconductor field effect transistor image sensor, a photodiode array, a position sensing detector, or any other device applicable for capturing or obtaining the thermal radiation image.

Figure 2B:
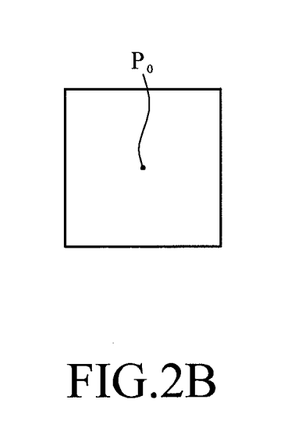
FIG. 2B is a thermal radiation image detected by the array photo detecting module in FIG. 2A.

Specifically, the array photo detecting device 13 may be used for detecting whether the work piece 20 is located at a position on the focal plane of the laser beam of the laser machining system 1. For example, please refer to FIG. 1, FIG. 2A, and FIG. 2B, wherein FIG. 2B is a thermal radiation image detected by the array photo detecting module in FIG. 2A. It is shown FIG. 2A that the work piece 20 is at a position on the focal plane of the laser beam of the laser machining system 1 and a working distance $d_0$, which, in one embodiment, is the focal length of the focusing lens 19, is defined under such circumstance. In other words, the present distance between the focusing lens 19 and the work piece 20 is the working distance $d_0$ when the work piece 20 is at a position on the focal plane of the laser beam. As shown in FIG. 2A and FIG. 2B, a machining area of the work piece 20, heated by the laser beam, has a centroid and the centroid of the machining area is corresponding to a temperature centroid of the thermal radiation image shown in FIG. 2B when the thermal radiation is captured by the array photo detecting device 13. Further, the temperature centroid of the thermal radiation image may be defined as a calibration coordinate $P_0$ when the work piece 20 is at a position on the focal plane of the laser beam (equivalently, the present distance is equal to the working distance $d_0$).

Figure 2C:
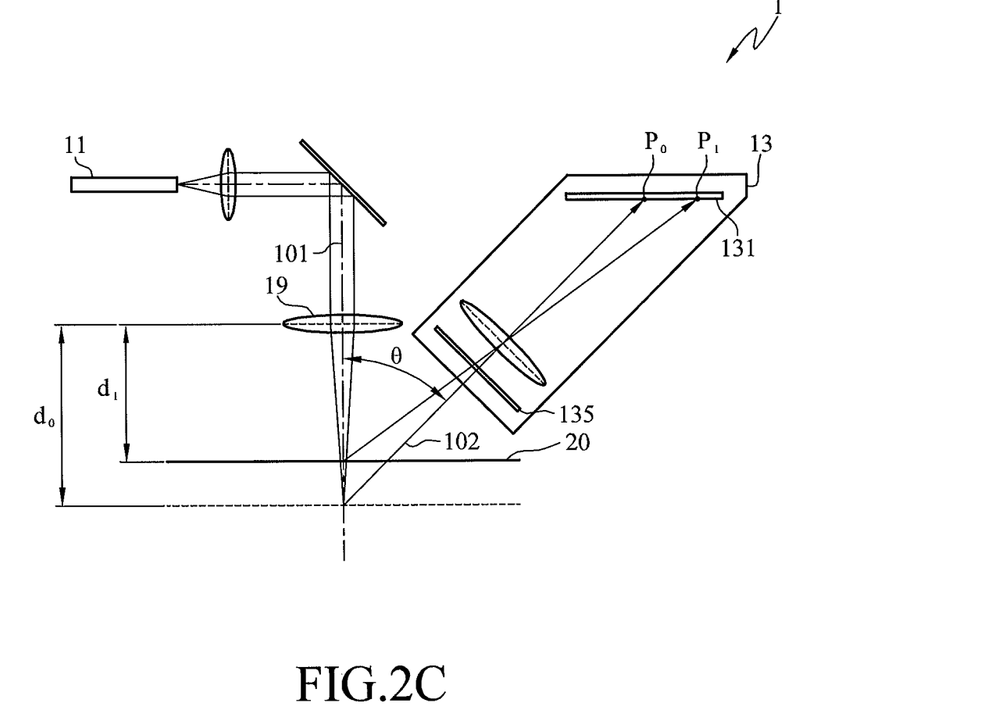
FIG. 2C is a defocus operation schematic of a laser machining system according to one embodiment of this disclosure.
Figure 2D:
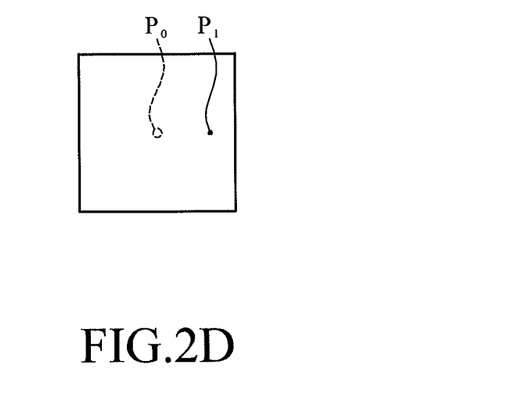
FIG. 2D is a thermal radiation image detected by the array photo detecting module in FIG. 2C.

Under some operation states, the present distance between work piece 20 and the focusing lens 19 may be less than the working distance $d_0$, and such operation states may be discovered from the thermal radiation image. Please refer to FIG. 2C and FIG. 2D, wherein FIG. 2C is a defocus operation schematic of a laser machining system according to one embodiment of this disclosure and FIG. 2D is a thermal radiation image detected by the array photo detecting module in FIG. 2C. As shown in FIG. 2C, a present distance $d_1$ between the work piece 20 and the focusing lens 19 is less than the working distance $d_0$. The centroid of the machining area of the work piece 20 is corresponding to a temperature centroid $P_1$ of the thermal radiation image shown in FIG. 2D when the thermal radiation is captured by the array photo detecting device 13. As shown in FIG. 2D, the temperature centroid $P_1$ is different from the calibration coordinate $P_0$.

Figure 2E:
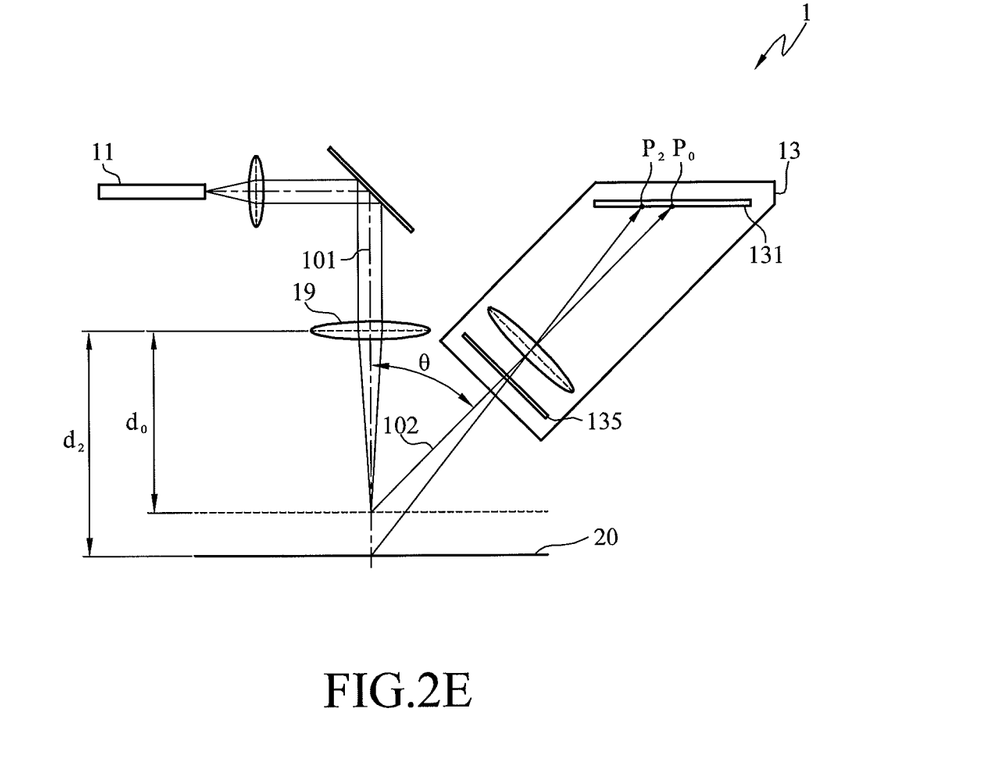
FIG. 2E is a defocus operation schematic of a laser machining system according to one embodiment of this disclosure.
Figure 2F:
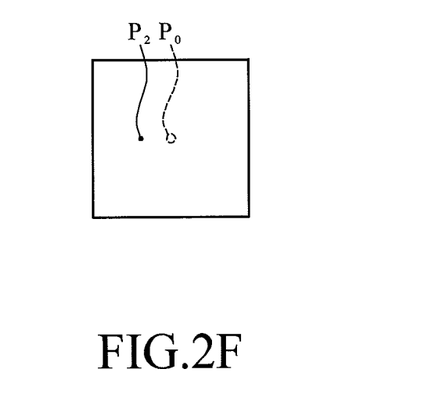
FIG. 2F is a thermal radiation image detected by the array photo detecting module in FIG. 2E.

Under another operation state, the present distance between work piece 20 and the focusing lens 19 may be greater than the working distance $d_0$, and such operation state may be discovered from the thermal radiation image. Please refer to FIG. 2E and FIG. 2F, wherein FIG. 2E is a defocus operation schematic of a laser machining system according to one embodiment of this disclosure and FIG. 2F is a thermal radiation image detected by the array photo detecting module in FIG. 2E. As shown in FIG. 2E, a present distance $d_2$ between the work piece 20 and the focusing lens 19 is greater than the working distance $d_0$. The centroid of the machining area of the work piece 20 is corresponding to a temperature centroid $P_2$ of the thermal radiation image shown in FIG. 2F when the thermal radiation is captured by the array photo detecting device 13. As shown in FIG. 2F, the temperature centroid $P_2$ is different from the calibration coordinate $P_0$. As a conclusion, if the present distance is not equal to the working distance $d_0$, the temperature centroid of the thermal radiation image will not equal to the calibration coordinate $P_0$. Hence, in one or more exemplary embodiment of this disclosure, the processing device 15 may determine whether the present distance is equal to the working distance $d_0$ according to the temperature centroid of the thermal radiation image.

The processing device 15 is configured to calculate the temperature centroid of the thermal radiation image and generate a distance control signal according to the temperature centroid. In one exemplary embodiment of this disclosure, as shown in FIG. 1, the processing device 15 may comprise a temperature computing module 151, a centroid computing module 153, a compensating module 155, and a power controlling module 158. The temperature computing module 151 is electrically coupled to the array photo detecting device 13. The centroid computing module 153 is electrically coupled to the temperature computing module 151. The compensating module 155 is electrically coupled to the centroid computing module 153 and the positioning device 17. The power controlling module 158 is electrically coupled to the temperature computing module 151 and the laser generating device 11. In practice, the processing device 15 and the modules therein may be realized by, for example but not limited in, an application-specific integrated circuit, an advanced RISC machine, a central processing unit, a 8051 chip or any other device applicable for performing computing instructions and/or controlling instructions.

The temperature computing module 151 is configured to calculate a corresponding temperature value for a pixel among a plurality of pixels of the thermal radiation image according to a grayscale of the pixel. For example, when the temperature computing module 151 is to calculate a first corresponding temperature value of a first pixel among the plurality of the thermal radiation image, the temperature computing module 151 may firstly calculate a first received energy of the first pixel according to a first grayscale of the first pixel. After the first grayscale is calculated, the temperature computing module 151 may calculate the first corresponding temperature corresponding to the first pixel with the Wien's distribution law or the Plank's law according to the first grayscale. The first corresponding temperature value is the temperature of a first area on the work piece 20 which is corresponding to the first pixel of the thermal radiation image.

For example, take the first received energy value and the first corresponding temperature value into consider, the Plank's law describes a relationship between the first received energy value, the first corresponding temperature value, and a wavelength as below:

$$I_1(\lambda) \cong 2hc^2\lambda^{-5}e^{\frac{-hc}{\lambda kT_1}} \quad (1)$$

In the equation (1), $I_1$ is related to the first received energy of the first pixel, h is the Plank constant, c is the speed of light, $\lambda$ is the wavelength of the thermal radiation received by the first pixel, k is the Boltzmann constant, and $T_1$ is the first corresponding temperature value, expressed in the form of the absolute temperature. In one exemplary embodiment, as shown in FIG. 2A, the aforementioned array photo detecting device 13 may comprises an array photo detecting module 131 and a optical filter 135, located in the second light path 102. The optical filter 135 may filter the thermal radiation to obtain an output light with a particular spectrum distribution different from an original spectrum distribution of the thermal radiation. The array photo detecting module 131 may obtain the thermal radiation image according to the output light. For example, the output light may be infrared light. If only the infrared light with wavelength between 700 nm and 1000 nm passes the optical filter 135 to be received by the array photo detecting module 131, the first received energy received by the first pixel equals to a summation of the energy of all infrared light whose wavelength is between 700 nm and 1000 nm. Under such circumstance, the relationship between the first received energy $E_1$ and the first corresponding temperature value $T_1$ can be described as an equation as:

$$E(T) = 2hc^2 e^{\frac{-hc}{\lambda kT}} \left[ \left(\frac{hc}{kT}\right)^{-1}\lambda^{-3} + \right. \quad (2)$$

$$\left. 3\left(\frac{hc}{kT}\right)^{-2}\lambda^{-2} + 6\left(\frac{hc}{kT}\right)^{-3}\lambda^{-1} + 6\left(\frac{hc}{kT}\right)^{-4} \right]_{\lambda=700\,nm}^{\lambda=1\,um}$$

The aforementioned equation (2) is an integration of the equation (1) taking the wavelength $\lambda$ as an integrated variable. It is clear that if the first received energy $E_1$ is known, one can use the equation (2) to derive the first corresponding temperature value $T_1$.

The centroid computing module 153 may calculate the temperature centroid according to a corresponding coordinate of each pixel among the plurality of pixels and the corresponding temperature value of each pixel among the plurality of pixels. For example, for each pixel among the plurality of pixels of the thermal radiation image, a coordinate and a corresponding temperature value are known. In one embodiment, a number of the plurality of pixels is n, the coordinate of the $i_{th}$ pixel among pixels can be expressed as $(x_i, y_i)$, wherein $x_i$ and $y_i$ are respectively a x-axis coordinate value and a y-axis coordinate value of the $i_{th}$ pixel, and the corresponding temperature of the $i_{th}$ pixel is $T_i$. The x-axis coordinate value of the $i_{th}$ pixel may be defined as which column of the thermal radiation image the $i_{th}$ pixel belongs to, and the y-axis coordinate value of the $i_{th}$ pixel may be defined as which row of the thermal radiation image the $i_{th}$ pixel belongs to. The temperature centroid can be calculated by:

$$X_M = \frac{\sum_{i=1}^{n} x_i T_i}{\sum_{i=1}^{n} T_i} \quad (3)$$

$$Y_M = \frac{\sum_{i=1}^{n} y_i T_i}{\sum_{i=1}^{n} T_i} \quad (4)$$

In the equation (3) and equation (4), $X_M$ is a x-axis coordinate value of the temperature centroid, and $Y_M$ is a y-axis coordinate value of the temperature centroid.

The compensating module 155 may generate the distance control signal according to the temperature centroid. Specifically, the compensating module 155 may determine whether the present distance is equal to the working distance $d_0$ according to the temperature centroid in order to the distance control signal. In one exemplary embodiment, as shown in FIG. 1, the processing device 15 may further comprises a storage module 157. The storage module 157 is electrically coupled to the compensating module 155. There may be a coordinate-to-distance table stored in the storage module 157. Hence, the compensating module 155 may determine the present distance according to the temperature centroid and the coordinate-to-distance table so as to generate the distance control signal. After the present distance is derived according to the temperature centroid and the coordinate-to-distance table, the compensating module 155 may calculate a displacement value according to the present distance ant the working distance $d_0$. The distance control signal may comprise the displacement value so that the positioning device 17 may adjust the present distance, between the laser machining system 1 (or the focusing lens 19) and the work piece 20, to the working distance $d_0$ according to the displacement value.

In another exemplary embodiment of this disclosure, the storage module 157 may store a grayscale conversion model therein. When the temperature computing module 151 calculates the first corresponding temperature value for the first pixel among the plurality of the thermal radiation image, the temperature computing module 151 may obtain the first corresponding temperature value according to the first grayscale and the grayscale conversion model. The grayscale conversion model comprises information collected from a plurality of experiment and/or a plurality of measurement. In one exemplary embodiment of this disclosure, the grayscale conversion model may be a grayscale-to-temperature table. In another exemplary embodiment of this disclosure, the grayscale conversion model may be a conversion function describing the relationship between the grayscale and the temperature value. The conversion function may be derived from the collected information with a curve fitting or a regression analysis.

However, in some cases, the laser machining system 1 may be abnormally operated or be affected by some environmental factor, such as a change of the environment temperature or an earth quake, and the coordinate-to-distance table is not accurate. Under such circumstance, the adjusted present distance is not equal to the working distance $d_0$, and there is a distance offset between the adjusted present distance and the working distance $d_0$. The compensating module 155 may calculate a compensation parameter according to the distance offset to update the coordinate-to-distance table.

In another exemplary embodiment of this disclosure, the storage module 157 may store the calibration coordinate $P_0$ therein. It is mentioned that if the present distance is not equal to the working distance $d_0$, the temperature centroid is not equal to the calibration coordinate $P_0$. Hence, the compensating module 155 may determine whether the present distance is equal to the working distance $d_0$ by determining whether the temperature centroid is equal to the calibration coordinate $P_0$. Further, the compensating module 155 controls the positioning device 17 to move the laser machining system 1 or the work piece 20 until the temperature centroid is equal to the calibration coordinate $P_0$.

The power controlling module 158 may control the laser generating device 11 to project the laser beam. In one exemplary embodiment of this disclosure, the power controlling module 158 further generates a power control signal to control a laser power of the laser beam. Specifically, the power controlling module 158 may generate the power control signal so that the laser generating device 11 may increase or decrease the laser power according to the power control signal. As a consequence, a machining dimension of a machining area on the work piece 20 and the highest temperature in the machining area may be controlled.

In one embodiment of this disclosure, the processing device 15 may further comprise a machining area computing module 159. The machining area computing module 159 is electrically coupled to the temperature computing module 151 and the power controlling module 158. The machining area computing module 159 may calculate a present machining dimension of the machining area on the work piece 20 according to the thermal radiation image. The machining area computing module 159 may select a plurality of high-temperature pixels from the plurality of pixels of the thermal radiation image and calculate the present machining dimension according to the plurality of high-temperature pixels, wherein the corresponding temperature value of each high-temperature pixel is larger than a temperature threshold value. Specifically, the present machining dimension of the machining area may be calculated according to a system setting or the characteristic of the material of the work piece 20. For example, the work piece 20 has to be heated to 500° C. in one machining process, so the machining area is the area on the work piece 20 in which a surface temperature is no less than 500° C. Hence, the machining area computing module 159 may find area with a surface temperature no less than 500° C. on the work piece 20 according to the thermal radiation image and calculate the dimension of the found area. The found area is the machining area and the calculated dimension is the present machining dimension.

In one exemplary embodiment, the power controlling module 158 may generate the power control signal according to the present machining dimension and a predetermined machining dimension. For example, the power controlling module 158 generates the power control signal to increase the laser power when the present machining dimension is smaller than the predetermined machining dimension so that the highest temperature in the machining area and the present machining dimension are increased. On the contrary, the power controlling module 158 generates the power control signal to decrease the laser power when the present machining dimension is larger than the predetermined machining dimension so that the highest temperature in the machining area and the present machining dimension are decreased.

Figure 3A:
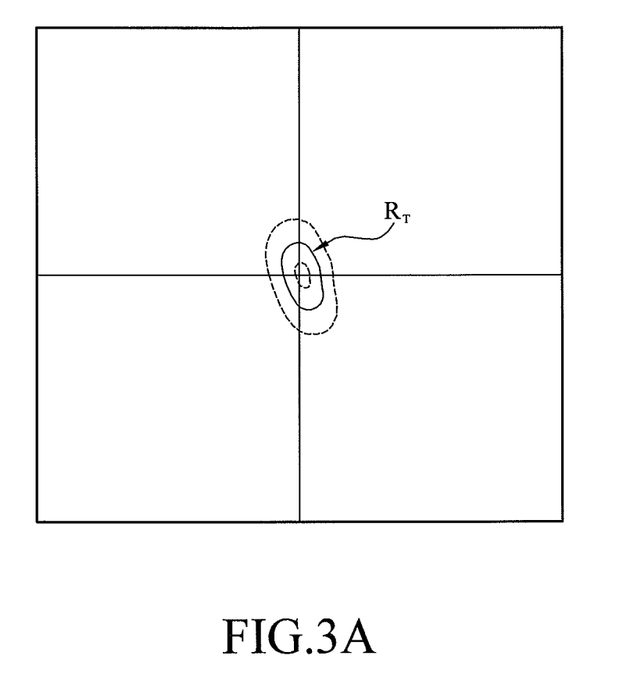
FIG. 3A is an isotherm schematic according to one embodiment of this disclosure.
Figure 3B:
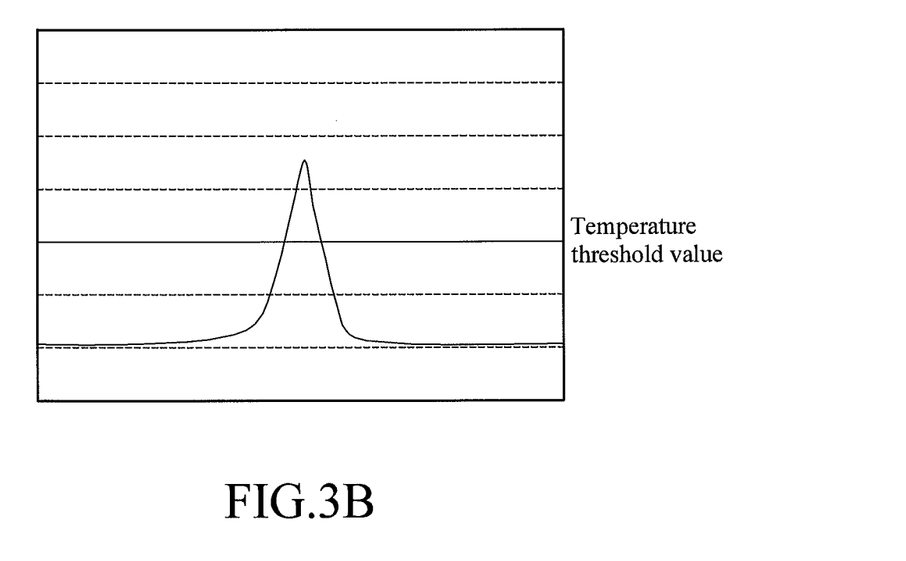
FIG. 3B is a temperature distribution schematic related to FIG. 3A.

In one exemplary embodiment of this disclosure, please refer to FIG. 3A and FIG. 3B, FIG. 3A is an isotherm schematic according to one embodiment of this disclosure and FIG. 3B is a temperature distribution schematic related to FIG. 3A. As shown in FIG. 3B, the machining area computing module 159 may select a plurality of high-temperature pixels from a plurality of pixels of the thermal radiation image and calculate the present machining dimension according to the plurality of high-temperature pixels. The high-temperature pixels are those pixels whose corresponding temperature value is larger than a temperature threshold value. As shown in FIG. 3A, the high-temperature pixels selected by the machining area computing module 159 are enclosed by the isotherm $R_T$. The machining area computing module 159 may identify the area enclosed by the isotherm $R_T$ as the machining area and calculate radius or any other dimension of the machining area.

Figure 3C:
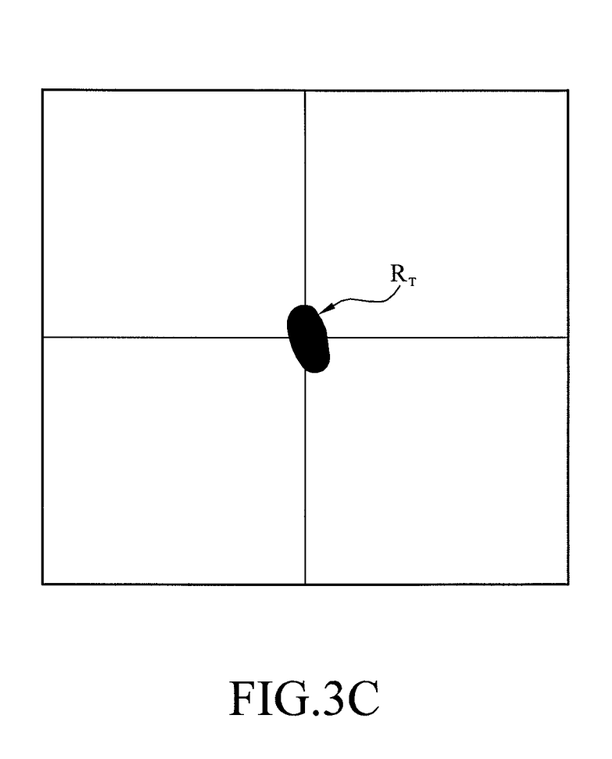
FIG. 3C is a high-temperature area schematic corresponding to FIG. 3A in one embodiment of this disclosure.

With the concept of the temperature threshold value, the centroid computing module 153 may select a plurality of high-temperature pixels from the plurality of pixels and calculates the temperature centroid according to the plurality of high-temperature pixels, wherein the corresponding temperature value of each high-temperature pixel is larger than a temperature threshold value. Please refer to FIG. 3C, which is a high-temperature area schematic corresponding to FIG. 3A in one embodiment of this disclosure. As shown in FIG. 3C, the centroid computing module 153 may recognize the black area enclosed by the isotherm $R_T$ as the area composed of the high-temperature pixels. Hence, the centroid computing module 153 may calculate the geometric centroid of the black area and take the calculated geometric centroid as the temperature centroid.

The positioning device 17 may controlled by the distance control signal to adjust the present distance, between the laser machining system 1 (or the focusing lens 19) and the work piece 20, to the working distance $d_0$. In one embodiment, the work piece 20 is large and hard to be moved, such as the vehicle body, so the positioning device 17 moves the laser machining system 1. In another embodiment, the work piece 20 is small and easy to be moved, such as one or more metal plates, so the positioning device 17 moves the work piece 20. According to one ore more embodiment of this disclosure, the positioning device 17 may be, for example but not limited in, a Cartesian robot arm, a selective compliance articulated robot arm, a parallel robot arm, or any other device applicable for controlling the present distance between the laser machining system 1 and the work piece 20.

Figure 4A:
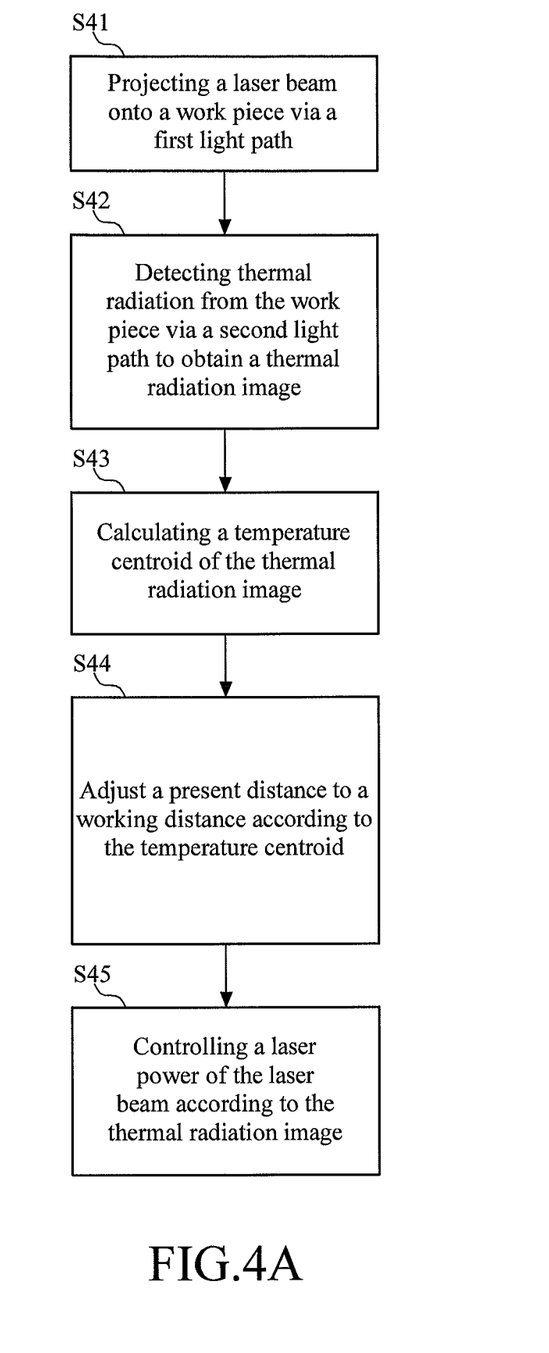
FIG. 4A is a flow chart of a laser machining method according to one embodiment of this disclosure.

Referring to the laser machining method according to one exemplary embodiment of this disclosure, please refer to FIG. 1 and FIG. 4A, wherein FIG. 4A is a flow chart of a laser machining method according to one embodiment of this disclosure. As shown in block S41, the laser generating device 11 projects a laser beam onto the work piece 20 via the first light path 101. As shown in block S42, the array photo detecting device 13 detects thermal radiation from the work piece 20 via the second light path 102 to obtain the thermal radiation image. The second light path 102 is different from the first light path 101, and the path angle, defined by the first light path 101 and the second light path 102, may be greater than zero degree and less than sixty degree. As shown in block S43, the processing device 15 calculates the temperature centroid of the thermal radiation image. As shown in block S44, the processing device 15 controls the positioning device 17 according to the temperature centroid in order to adjust the present distance, between the laser machining system 1 (or the focusing lens 19) and the work piece 20, to the working distance $d_0$ (the focal length of the focusing lens 19).

Figure 4B:
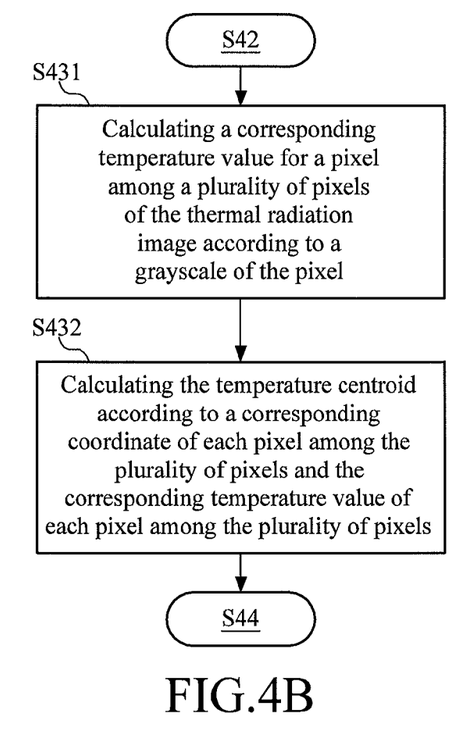
FIG. 4B is a flow chart of the block S43 in FIG. 4A according to one embodiment of this disclosure.

Referring to the flow of the block S43 in one exemplary embodiment of this disclosure, please refer to FIG. 1 and FIG. 4B, wherein FIG. 4B is a flow chart of the block S43 in FIG. 4A according to one embodiment of this disclosure. As shown in block S431, the temperature computing module 151 calculates a corresponding temperature value for a pixel among a plurality of pixels of the thermal radiation image according to a grayscale of the pixel. As shown in block S432, the centroid computing module 153 calculates the temperature centroid according to a corresponding coordinate of each pixel among the plurality of pixels and the corresponding temperature value of each pixel among the plurality of pixels.

In block S431 in one exemplary embodiment of this disclosure, the temperature computing module 151 firstly calculates a received energy of a pixel according to a grayscale of the pixel and then calculates the corresponding temperature value of the pixel with the Wien's distribution law or the Plank's law according to the received energy.

In block S432 in one exemplary embodiment of this disclosure, the centroid computing module 153 may calculate the temperature centroid according to a corresponding coordinate of each pixel among the plurality of pixels and the corresponding temperature value of each pixel among the plurality of pixels. For example, for each pixel among the plurality of pixels of the thermal radiation image, a coordinate and a corresponding temperature value are known. In one embodiment, a number of the plurality of pixels is n, the coordinate of the $i_{th}$ pixel among pixels can be expressed as $(x_i, y_i)$, wherein $x_i$ and $y_i$ are respectively a x-axis coordinate value and a y-axis coordinate value of the $i_{th}$ pixel, and the corresponding temperature of the $i_{th}$ pixel is $T_i$. The x-axis coordinate value of the $i_{th}$ pixel may be defined as which column of the thermal radiation image the $i_{th}$ pixel belongs to, and the y-axis coordinate value of the $i_{th}$ pixel may be defined as which row of the thermal radiation image the $i_{th}$ pixel belongs to. The temperature centroid can be calculated by the aforementioned equation (3) and equation (4). In another embodiment, the centroid computing module 153 may calculate the geometric centroid of a group comprising all high-temperature pixels and take the calculated geometric centroid as the temperature centroid.

Figure 4C:
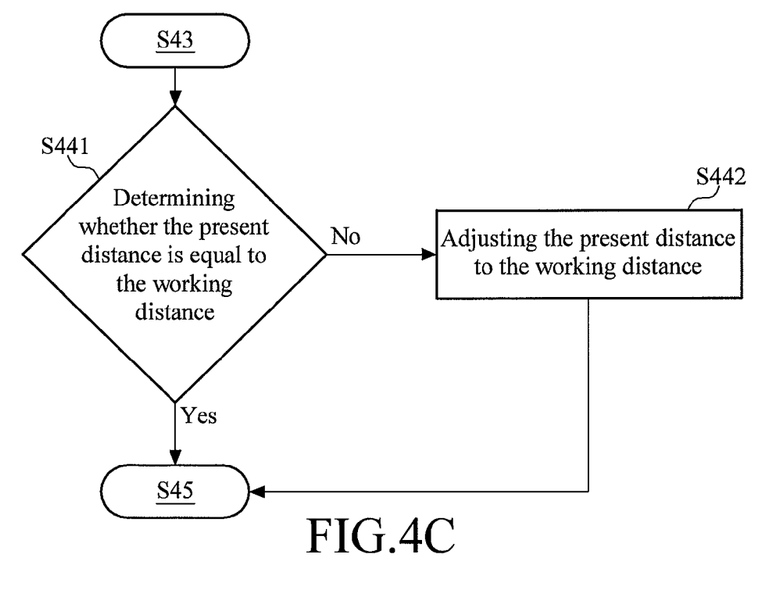
FIG. 4C is a flow chart of the block S44 in FIG. 4A according to one embodiment of this disclosure.

Referring to the flow of the block S44 in one exemplary embodiment of this disclosure, please refer to FIG. 1 and FIG. 4C, wherein FIG. 4C is a flow chart of the block S44 in FIG. 4A according to one embodiment of this disclosure. As shown in block S441, the compensating module 155 may determine whether the present distance is equal to the working distance $d_0$. If the present distance is not equal to the working distance $d_0$, as shown in block S442, the compensating module 155 may generate the distance control signal to control the positioning device 17 to adjust the present distance to the working distance $d_0$.

In block S441 in one exemplary embodiment of this disclosure, the compensating module 155 may determine the present distance according to the temperature centroid and the coordinate-to-distance table stored in the storage module 157 and subtract the present distance with the working distance $d_0$ to obtain the displacement value. The compensating module 155 may generate the distance control signal according to the displacement value to control the positioning device 17 so that the positioning device 17 may adjust the present distance by moving the laser machining system 1 or the work piece 20 according to the control signal (or equivalently, the displacement value). After the present distance is adjusted, the compensating module 155 may compare the adjusted present distance with the working distance $d_0$ to determine whether the adjusted present distance is equal to the working distance $d_0$. If the adjusted present distance is not equal to the working distance $d_0$, the compensating module 155 may calculate a distance offset according to the adjusted present distance and the working distance $d_0$ and update the coordinate-to-distance table according to the distance offset.

In block S441 in another exemplary embodiment of this disclosure, the compensating module 155 may determine whether the present distance is equal to the working distance $d_0$ by determining whether the temperature centroid is equal to the calibration coordinate $P_0$. If the present distance is not equal to the working distance $d_0$, the compensating module 155 may generate the distance control signal to control the positioning device 17 to adjust the present distance until the temperature centroid is equal to the calibration coordinate $P_0$ so that the adjusted present distance is equal to the working distance $d_0$.

Figure 4D:
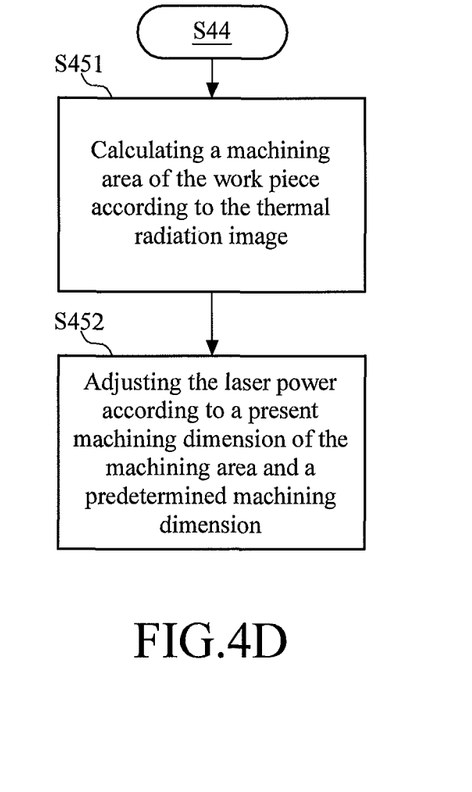
FIG. 4D is a flow chart of the block S45 in FIG. 4A according to one embodiment of this disclosure.

Referring to the laser machining method according to another exemplary embodiment of this disclosure, please refer to FIG. 1 and FIG. 4A. The method may further comprises block S45, the processing device 15 may control the laser power of the laser beam according to the thermal radiation image. Specifically, please refer to FIG. 4D, which is a flow chart of the block S45 in FIG. 4A according to one embodiment of this disclosure. As shown in block S451, the machining area computing module 159 may calculate the machining area of the work piece 20 according to the thermal radiation image. As shown in block S452, the power controlling module 158 may generate a power control signal to control the laser generating device 11 to adjust the laser power according to the present machining dimension of the machining area and the predetermined machining dimension.

According to one or more exemplary embodiment of this disclosure, the theorem black body radiation is applicable for the disclosed laser machining system. In the disclosed laser machining system, the first light path via which the laser beam is projected and the second light path via which the thermal radiation is detected/obtained are different. Hence, the temperature parameters of the work piece, such as the temperature value, the temperature distribution, the temperature gradient, etc., and the present distance between the work piece and the laser machining system can be detected with one single device, the array photo detecting device. Further, the disclosed laser machining system may operate directly according to the thermal radiation image. Hence, compared with the conventional laser machining system, the disclosed laser machining system can control the machining dimension on the work piece and the present distance without further complicated detecting method and/or controlling mechanism.

It will be apparent to those skilled in the art that various modifications and variations can be made to the disclosed embodiments. It is intended that the specification and examples be considered as exemplary only, with a true scope of the disclosure being indicated by the following claims and their equivalents.

The invention claimed is:

1. A laser machining method applicable for a laser machining system, the laser machining method comprising:

projecting a laser beam onto a work piece via a first light path;
detecting thermal radiation from the work piece via a second light path to obtain a thermal radiation image, wherein the second light path is different from the first light path;
calculating a temperature centroid of the thermal radiation image, comprising:
  calculating a corresponding temperature value for a pixel among a plurality of pixels of the thermal radiation image according to a grayscale of the pixel; and
  calculating the temperature centroid according to a corresponding coordinate and the corresponding temperature value of each pixel among the plurality of pixels; and
adjusting a present distance to a working distance by controlling the laser machining system according to the temperature centroid, wherein the present distance is between the laser machining system and the work piece;
wherein the temperature centroid is calculated by two equations, and the two equations are:

$$X_M = \frac{\sum_{i=1}^{n} x_i T_i}{\sum_{i=1}^{n} T_i}$$

$$Y_M = \frac{\sum_{i=1}^{n} y_i T_i}{\sum_{i=1}^{n} T_i}$$

wherein $X_M$ is a x-axis coordinate value of the temperature centroid, $Y_M$ is a y-axis coordinate value of the temperature centroid, n is a total number of the plurality of pixels, $x_i$ and $y_i$ are respectively a x-axis coordinate value and a y-axis coordinate value of a $i_{th}$ pixel of the plurality of pixels, and $T_i$ is the corresponding temperature value of the $i_{th}$ pixel of the plurality of pixels.

2. The laser machining method according to claim 1, wherein the step of calculating the corresponding temperature value for the pixel among the plurality of pixels of the thermal radiation image according to the grayscale of the pixel comprises:
  calculating a received energy value of the pixel according to the grayscale of the pixel; and
  calculating the corresponding temperature value of the pixel with the Wien's distribution law according to the received energy value.

3. The laser machining method according to claim 1, wherein the step of calculating the corresponding temperature value for the pixel among the plurality of pixels of the thermal radiation image according to the grayscale of the pixel comprises:
  calculating a received energy value of the pixel according to the grayscale of the pixel; and
  calculating the corresponding temperature value of the pixel with the Plank's law according to the received energy value.

4. The laser machining method according to claim 1, wherein the step of calculating the temperature centroid according to the corresponding coordinate and the corresponding temperature value of each pixel among the plurality of pixels comprises:
  selecting a plurality of high-temperature pixels from the plurality of pixels, wherein the corresponding temperature value of each high-temperature pixel is larger than a temperature threshold value; and
  calculating the temperature centroid according to the plurality of high-temperature pixels.

5. The laser machining method according to claim 1, further comprising controlling a laser power of the laser beam according to the thermal radiation image.

6. The laser machining method according to claim 5, wherein the step of controlling the laser power of the laser beam according to the thermal radiation image comprises:
  calculating a present machining dimension of the work piece according to the thermal radiation image; and
  adjusting the laser power according to the present machining dimension and a predetermined machining dimension.

7. The laser machining method according to claim 6, wherein the step of calculating the present machining dimension of the work piece according to the thermal radiation image comprises:
  calculating a corresponding temperature value for a pixel among a plurality of pixels of the thermal radiation image according to a grayscale of the pixel;
  selecting a plurality of high-temperature pixels from the plurality of pixels, wherein the corresponding temperature value of each high-temperature pixel is larger than a temperature threshold value; and
  calculating the present machining dimension according to the plurality of high-temperature pixels.

8. The laser machining method according to claim 7, wherein the step of adjusting the laser power according to the present machining dimension and the predetermined machining dimension comprises:
  comparing the present machining dimension with the predetermined machining dimension;
  increasing the laser power if the present machining dimension is smaller than the predetermined machining dimension; and
  decreasing the laser power if the present machining dimension is larger than the predetermined machining dimension.

9. The laser machining method according to claim 1, wherein the step of controlling the machining system according to the temperature centroid comprises:
  determining whether the present distance is equal to the working distance according to the temperature centroid; and
  adjusting the present distance if the present distance is not equal to the working distance.

10. The laser machining method according to claim 9, wherein the step of determining if the present distance is equal to the working distance according to the temperature centroid comprises:
  determining the present distance according to the temperature centroid and a coordinate-to-distance table.

11. The laser machining method according to claim 10, wherein the step of adjusting the present distance if the present distance is not equal to the working distance comprises:
  calculating a displacement value according to the present distance and the working distance; and
  moving the laser machining system or the work piece according to the displacement value so as to adjust the present distance.

12. The laser machining method according to claim 11, further comprising:

comparing the adjusted present distance with the working distance to determine whether the adjusted present distance is equal to the working distance;

calculating a compensation parameter according to the adjusted present distance and the working distance if the adjusted present distance is not equal to the working distance; and updating the coordinate-to-distance table according to the compensation parameter.

13. The laser machining method according to claim 9, wherein in the step of determining whether the present distance is equal to the working distance according to the temperature centroid, a judgment that whether the present distance is equal to the working distance is by determining whether the temperature centroid is equal to a calibration coordinate.

14. The laser machining method according to claim 13, wherein in the step of adjusting the present distance if the present distance is not equal to the working distance, the present distance is adjusted to make the temperature centroid equal to the calibration coordinate.

15. The laser machining method according to claim 1, wherein the step of detecting thermal radiation from the work piece illuminated by the laser beam via the second light path to obtain the thermal radiation image comprises:

filtering the thermal radiation with a optical filter to obtain an output light with a particular spectrum distribution different from an original spectrum distribution of the thermal radiation; and capturing the thermal radiation image according to the output light.

16. The laser machining method according to claim 1, wherein a path angle between the first light path and the second light path is larger than zero degree.

17. The laser machining method according to claim 16, wherein the path angle is less than sixty degree.

18. A laser machining system, comprising:

a laser generating device, configured to project a laser beam onto a work piece via a first light path;

a array photo detecting device, configured to detect thermal radiation from the work piece via a second light path to obtain a thermal radiation image, wherein the second light path is different from the first light path;

a processing device, electrically coupled to the laser generating device and the array photo detecting device, configured to calculate a temperature centroid of the thermal radiation image and generate a distance control signal according to the temperature centroid, the processing device comprising:

a temperature computing module, electrically coupled to the array photo detecting device, configured to calculate a corresponding temperature value for a pixel among a plurality of pixels of the thermal radiation image according to a grayscale of the pixel;

a centroid computing module, electrically coupled to the temperature computing module, configured to calculate the temperature centroid of the thermal radiation image according to a corresponding coordinate of each pixel among the plurality of pixels and the corresponding temperature value of each pixel among the plurality of pixels; and a compensating module, electrically coupled to the centroid computing module and the positioning device, configured to generate the distance control signal according to the temperature centroid; and a positioning device, electrically coupled to the processing device, configured to be controlled by the distance control signal to adjust a present distance, between the laser machining system and the work piece, to a working distance;

wherein the centroid computing module calculates the temperature centroid by two equations, and the two equations are:

$$X_M = \frac{\sum_{i=1}^{n} x_i T_i}{\sum_{i=1}^{n} T_i}$$

$$Y_M = \frac{\sum_{i=1}^{n} y_i T_i}{\sum_{i=1}^{n} T_i}$$

wherein $X_M$ is a x-axis coordinate value of the temperature centroid $Y_M$ is a y-axis coordinate value of the temperature centroid, n is a total number of the plurality of pixels, $x_i$ and $y_i$ are respectively a x-axis coordinate value and a y-axis coordinate value of a $i_{th}$, pixel of the plurality of pixels, and $T_i$ is the corresponding temperature value of the $i_{th}$, pixel of the plurality of pixels.

19. The laser machining system according to claim 18, wherein the temperature computing module calculates a received energy value of the pixel according to the grayscale of the pixel and calculates the corresponding temperature value of the pixel with the Wien's distribution law according to the received energy value.

20. The laser machining system according to claim 18, wherein the temperature computing module calculates a received energy value of the pixel according to the grayscale of the pixel and calculates the corresponding temperature value of the pixel with the Plank's law according to the received energy value.

21. The laser machining system according to claim 18, wherein the centroid computing module selects a plurality of high-temperature pixels from the plurality of pixels and calculates the temperature centroid according to the plurality of high-temperature pixels, wherein the corresponding temperature value of each high-temperature pixel is larger than a temperature threshold value.

22. The laser machining system according to claim 18, wherein the processing device further generates a power control signal according to the thermal radiation image and the laser generating device controls a laser power of the laser beam according to the power control signal.

23. The laser machining system according to claim 22, wherein the processing device further comprises:

a machining area computing module, electrically coupled to the temperature computing module, configured to calculate a present machining dimension of the work piece according to the thermal radiation image; and a power controlling module, electrically coupled to the machining area computing module, configured to generate the power control signal according to the present machining dimension and a predetermined machining dimension.

24. The laser machining system according to claim 23, wherein the machining area computing module selects a plurality of high-temperature pixels from the plurality of pixels and calculates the present machining dimension according to the plurality of high-temperature pixels, wherein the corresponding temperature value of each high-temperature pixel is larger than a temperature threshold value.

25. The laser machining system according to claim 23, wherein the power controlling module compares the present machining dimension with the predetermined machining dimension to generate the power control signal.

26. The laser machining system according to claim 18, wherein the compensating module determines whether the present distance is equal to the working distance according to the temperature centroid to generate the distance control signal.

27. The laser machining system according to claim 26, wherein the processing device further comprises a storage module, electrically coupled to the compensating module and configured to store a coordinate-to-distance table, and the compensating module determines the present distance according to the temperature centroid and the coordinate-to-distance table to generate the distance control signal.

28. The laser machining system according to claim 27, wherein the compensating module generates the distance control signal according to the present distance and the working distance, and the positioning device moves the laser machining system or the work piece according to the distance control signal so as to adjust the present distance.

29. The laser machining system according to claim 28, wherein the compensating module further compares the adjusted present distance with the working distance to determine whether the adjusted present distance is equal to the working distance, and calculates a compensation parameter according to the adjusted present distance and the working distance if the adjusted present distance is not equal to the working distance, and updates the coordinate-to-distance table according to the compensation parameter.

30. The laser machining system according to claim 26, wherein the processing device further comprises a storage module, electrically coupled to the compensating module and configured to store a calibration coordinate, and the compensating module compares the temperature centroid with the calibration coordinate to determine whether the present distance is equal to the working distance to generate the distance control signal.

31. The laser machining system according to claim 30, wherein the positioning device adjust the present distance according to the distance control signal to make the temperature centroid equal to the calibration coordinate.

32. The laser machining system according to claim 18, wherein the array photo detecting device comprises:
    a optical filter, located in the second light path, configured to filter the thermal radiation to obtain an output light with a particular spectrum distribution different from an original spectrum distribution of the thermal radiation; and
    an array photo detecting module, located in the second light path and electrically coupled to the processing device, configured to obtain the thermal radiation image according to the output light.

33. The laser machining system according to claim 18, wherein a path angle between the first light path and the second light path is larger than zero degree.

34. The laser machining system according to claim 33, wherein the path angle is less than sixty degree.

* * * * *